(12) United States Patent
Benner, Jr.

(10) Patent No.: US 9,195,061 B1
(45) Date of Patent: Nov. 24, 2015

(54) SCANNING MIRROR SYSTEM AND ASSOCIATED METHODS

(71) Applicant: William R. Benner, Jr., Longwood, FL (US)

(72) Inventor: William R. Benner, Jr., Longwood, FL (US)

( * ) Notice: Subject to any disclaimer, the term of this patent is extended or adjusted under 35 U.S.C. 154(b) by 62 days.

(21) Appl. No.: 14/166,094

(22) Filed: Jan. 28, 2014

Related U.S. Application Data

(60) Provisional application No. 61/757,384, filed on Jan. 28, 2013.

(51) Int. Cl.
  *G02B 26/08* (2006.01)
  *G02B 26/12* (2006.01)
(52) U.S. Cl.
  CPC ..................................... *G02B 26/12* (2013.01)
(58) Field of Classification Search
  CPC ............. G02B 26/101; G02B 27/0031; G02B 26/0816
  USPC ........... 359/224.1, 202.1, 205.1, 199.1, 201.2
  See application file for complete search history.

(56) References Cited

U.S. PATENT DOCUMENTS

| 5,237,165 | A | 8/1993 | Tingley |
| 6,243,188 | B1 | 6/2001 | Stukalin et al. |
| D642,265 | S | 7/2011 | Hastings |
| 8,284,470 | B2 | 10/2012 | Brown et al. |
| 2003/0021497 | A1* | 1/2003 | Kandori et al. ............... 382/323 |

* cited by examiner

*Primary Examiner* — Euncha Cherry
(74) *Attorney, Agent, or Firm* — Carl M. Napolitano; GrayRobinson, P.A.

(57) ABSTRACT

A scanning mirror includes a reflective surface having a preset width dimension measured orthogonally to its axis of rotation. The preset width dimension accommodates a maximum angle of incidence of a beam being scanned by the reflective surface. A length dimension of the reflective surface, as measured along the axis of rotation, is at least equal to a diameter of the beam being scanned. A bottom portion of the reflective surface has an effective width dimension greater than the preset width dimension, and a top portion of the reflective surface has an effective width dimension less than the preset width dimension, such that a greater inertia is provided to the bottom portion of the scanning mirror that to the top portion. One shape for the reflective surface comprises a trapezoid.

15 Claims, 6 Drawing Sheets

SCANNING MIRROR SYSTEM AND ASSOCIATED METHODS

CROSS-REFERENCE TO RELATED APPLICATION

This application claims the benefit of U.S. Provisional Patent Application Ser. No. 61/757,384 filed Jan. 28, 2013, the disclosure of which is hereby incorporated by reference in its entirety and commonly owned.

FIELD OF THE INVENTION

The present invention generally relates to optical scanning and mirrors used in oscillating mechanical laser scanners, and more particularly to mirrors for mechanical scanners used in an X-Y configuration that perform vector scanning such as resonant scanners and galvanometric scanners.

BACKGROUND

Since the invention of the laser in 1959, it has proven to be a very useful invention. Indeed lasers have found a home in many applications, including medical devices, university laboratory experiments, nuclear physics, as well as many commercial applications.

A laser itself produces a non-moving beam of light, and for many applications, a laser beam itself can only be useful if it is being moved, by way of example when directed over a path to do work. However, unlike the electron beam produced within a cathode ray tube, laser beams cannot be deflected by magnetism or electrostatic plates.

Laser Beam Scanners

The process of moving a laser beam is commonly called "scanning", and devices that perform the scanning action are commonly called "scanners". A laser beam is typically scanned in one of three ways. It can be refracted through a medium whose index of refraction can be changed, diffracted by a grating whose grating period can be changed, or reflected off of a mirror whose position can be changed.

Scanner Types

Electro-optic scanners move a laser beam by changing the index of refraction of materials, such as Lithium Niobate. Acousto-optic scanners move the beam by changing the period of a diffraction grating, created by a radio-frequency signal acting on materials such as Tellurium Dioxide. Mechanical scanners change the position of a mirror.

Benefits and Drawbacks of Electro-Optic and Acoustic-Optic Scanners

There are benefits and drawbacks of electro-optic and acousto-optic scanners. Indeed, each type of laser beam scanner has benefits and drawbacks. It can be said that the main benefit of electro-optic and acousto-optic scanners is that they are capable of changing the deflected beam position very rapidly, typically in the range of microseconds or less. However, there are many drawbacks to these scanners, including that they are monochromatic (i.e. they work only with a single, predetermined wavelength); they have limited deflection resolution (typically 200 resolvable spots or less); they have a limited deflection angle (typically 2 degrees or less); and they also require somewhat complex driver circuitry.

Benefits and Drawbacks of Mechanical Scanners

The benefits and drawbacks associated with mechanical scanners are almost the opposite when compared with electro-optic and acousto-optic scanners. Since mechanical scanners move a mirror, the mirror can be coated with a reflective coating (such as aluminum) which reflects many wavelengths simultaneously and by the same amount, thus mechanical scanners are polychromatic and indeed, can be used with white light. Mechanical scanners are often formed by attaching the mirror to a motor, whose rotation angle can be changed quite a bit, and therefore a scan angle of 60 degrees or more is possible. The driver electronics for mechanical scanners can be as simple as analog op-amp circuits. Further, by using closed-loop control, a virtually infinite number of mirror positions (and thus beam deflection angles) becomes possible. However, one drawback of mechanical scanners is dictated by physics, insomuch that the speed is dictated by the amount of force (torque) that can be imposed on the mirror, and the mass (inertia) of the mirror. This limits mechanical scanners to the range of a few hundred hertz to a few kilohertz. Nevertheless, for applications requiring the deflection of more than one wavelength, or wide scan angle or high resolution or simplicity, mechanical scanners have become the tool of choice.

Mechanical Scanner Types

Mechanical scanners can generally be further classified as either "continuously rotating" or "oscillating." In the case of continuously rotating scanners, these are typically made of an optical element attached to the armature of a continuous rotating motor. The optical element may have mirrored facets (called a "rotating polygon scanner") or the optical element may a holographic imprint on a cylinder (called a "rotating Holographic Optical Element" scanner).

Resonant and Galvanometric Mechanical Scanners

Oscillating scanners can further be classified as either "resonant scanners" or "galvanometric scanners." Resonant scanners use a mirror along with a torsion rod, flat spring or flexure arrangement to form a resonant spring-mass system (with the mirror most often being the mass in this system). Galvanometric scanners are limited-rotation motors that, when first invented, worked as current-based meters, in that with an applied drive current increases, a rotation angle increases, and when an applied drive current is removed, the rotation angle is returned to a central position. Although modern galvanometric scanners no longer work on the basis of a current-based meter, the term Galvanometer-based Optical Scanner remains as a reference to the placement of a mirror on the output shaft of a limited-rotation motor.

Single-Dimensional (Single-Axis) Scanners

Almost all laser beam scanners are one-dimensional (single-axis) devices. That is, they deflect the laser beam along a single (usually linear) path. For example, such a laser scanner can be used inside hand-held bar code scanners at supermarkets or convenience stores, which scan the laser beam back and forth across a bar code printed on a package. Similarly, construction lasers may be used to create a visible line on the inside of a building while a ceiling or other elements are being assembled.

Creating a Two-Dimensional Scanner from Single-Dimensional Scanners

When necessary to project the laser over a path that is two-dimensional, it is common to use two one-dimensional scanners in an X-Y arrangement.

Raster and Vector Applications

Two-dimensional applications may be classified as either "raster" or "vector". A raster application is one in which the laser beam traces lines back and forth over a rectangular area. Generally, the number of lines and placement of the lines does not change. This is commonly the case for projection television applications and even for two-dimensional bar-code scanning.

A "vector" application is one that may direct the laser beam in virtually any direction at any time. For example, this may be used to point out a number of targets, or to project an animated outline drawing of a figure. The outline drawing can be a template where construction work is to be done, or even a cartoon figure for the purpose of entertaining people (for example, in laser light show applications).

Orthogonal (X-Y) Arrangements of Scanners

Whether the two-dimensional scanning application is for raster or vector purposes, the mechanical scanners are arranged in roughly the same way. A laser beam is directed toward a first mirror (typically referred to as the "X scanner"), and this first mirror deflects the beam in the direction of a second mirror (typically referred to as the "Y scanner"). The beam reflected off of the Y scanner is the two-dimensional-deflected laser beam, thus an orthogonal (X-Y) arrangement of scanners.

Mirror Size

By studying the mirror arrangement for two-dimensional scanning, it can be seen that the requirements for the first mirror are typically different from the requirements for the second mirror. The X mirror only needs to be large enough to capture the incoming laser beam and deflect it toward the Y mirror. In the case of the X mirror, it is effectively receiving a "spot", with a generally circular profile. However, the Y mirror is effectively receiving a "line" since the X mirror effectively distributes its incoming "spot" to an infinite number of locations along the Y mirror.

X-Mirror Dimensions

There are typically minimum dimensions of the X-mirror. The X mirror must of course have a size large enough to capture and reflect the incoming laser beam, and thus, its height and width must be at least as large as the incoming beam diameter. In reality, the height (dimension parallel to the axis of scanning or rotation) may be no greater than the beam diameter but the width (dimension perpendicular to the axis of scanning) must be increased in proportion to the secant (inverse cosine) of the laser beam's angle-of-incidence onto the surface of the mirror.

For example, to deflect a laser beam 90 degrees (i.e. to have an exit beam leave at a right-angle to an entrance beam), the first mirror will have a 45-degree angle-of-incidence with respect to the incoming laser beam. (Note that angles of incidence are specified from the perpendicular to the surface of the mirror.) The mirror effectively doubles (i.e. "mirrors") this angle of incidence with respect to the outgoing laser beam, and thus, a 45-degree mirror angle-of-incidence produces a 90-degree light beam deflection. In any event, because of the angular relationship of the mirror with respect to the incoming beam, the beam does not produce a circular profile on the mirror, but rather a generally oval shape. As the angle of incidence is increased, the "ovality" also increases.

Trigonometric Secant Describes a Minimum Width.

By way of example, a secant of 45 degrees is 1.41, which means that the mirror must be at least 1.41 times as wide as the incoming beam diameter. Using a 3-millimeter incoming beam as an example, it means the mirror will need to be at least 4.24 millimeters wide to fully capture and reflect the beam (secant of 45 degrees=1.41, multiplied by 3 millimeter beam diameter=4.24 millimeter mirror width).

As a laser scanner changes the angle of the mirror with respect to the incoming laser beam, the outgoing beam will also be changed (i.e. scanned). If the change in mirror direction increases the angle of incidence, then the mirror will need to be made even wider than it was as described above. For example, if the laser scanner changes the angle-of-incidence from 45 degrees to 55 degrees, the mirror will need to be at least 1.74 times as wide as the incoming beam diameter (secant of 55 degrees is 1.74 and thus the mirror needs to be at least 5.22 millimeters wide to capture and reflect the 3 millimeter beam). However, note that something very interesting happens. If the angle of incidence of the incoming beam changes by 10 degrees, it means that the angle of incidence of the outgoing beam also changes by 10 degrees. Moreover, since the mirror itself moved by 10 degrees, it means that the outgoing beam effectively moves by 20 degrees.

Optical Deflection Angle is Twice the Mechanical Deflection Angle.

Because of this phenomenon, it is quite often to use the terms "mechanical degrees" to describe the motion of the scanners and mirrors, and "optical degrees" to describe the motion of the scanned laser beam, and also often to read a notation that "optical deflection=twice the mechanical deflection."

60 Degree (Optical) Deflection

Consider a 60-degrees (optical) deflection, by way of example. If the laser scanner changes the angle of incidence to 60 degrees, the mirror will need to be made twice as wide as the incoming laser beam (secant of 60 degrees is 2.0 and thus the mirror needs to be at least 6 millimeters wide to capture and reflect the 3 millimeter beam) and, when compared to the case when the angle of incidence was 45 degrees, the outgoing beam will be deflected 30 degrees. Thus, the mirror angle of incidence was changed by the scanner+15 degrees and the laser beam is deflected+30 degrees. If the scanner changes the angle of incidence to 30 degrees (the 45-degree original position minus 15 degrees), then the outgoing beam will be deflected −30 degrees, thus providing 60-degrees optical peak-to-peak deflection.

Note that when the scanner places the mirror at a 30-degree angle of incidence, the beam will not be covering the entire 6-millimeter width of the mirror. This is because the spot size will only be 3.45 millimeters (secant of 30 degrees is 1.15 multiplied by the 3 millimeter incoming beam diameter). Nevertheless, the mirror needs to be at least as wide as the greatest angle of incidence that will be experienced during the scanning action.

Minimum Dimension for Y Mirror

As indicated above, the width of the mirror is dictated by the secant of the angle-of-incidence. In the case of the X mirror, the length may be made no greater than the beam diameter, and the length never changes. However, in the case of the Y mirror, the length needs to be much longer since it is capturing the deflected spot (effectively a line of light) from the X mirror, and the greater the distance between the X and Y mirrors, the greater the length the Y mirror will need to be in order to capture the line of light. In general, the length of the Y mirror must be at least equal to the distance between X and Y mirrors, multiplied by the tangent of half the peak to peak optical angle, multiplied by two. The Y mirror length= (distance*tan(peak-to-peak X optical angle/2))*2.

It is common to locate the Y mirror approximately 1.75 times the width of the X mirror (in this case, 1.75*6 millimeters, or 10.4 millimeters). Therefore, using our 3-millimeter beam and 60 peak-to-peak X optical angle from above: 10.4*tangent of 30 degrees=6.0, multiplied by 2=12 millimeters.

In other words, the minimum dimensions of an X mirror are 3 millimeters by 6 millimeters, and the minimum dimensions of the Y mirror are 6 millimeters by 12 millimeters. Thus, in this example the Y mirror has four times the inertia of the X mirror.

Mirror Thickness

Generally, scanning mirrors are made as thin as possible, while still being thick enough to maintain flatness of the reflective surface and also being thick enough to avoid resonances during scanning. If the mirrors are made too thin, they can resonate like a diving board resonates since it is typically like a cantilever that is only supported on one end. Such resonances will cause cross-axis wobble. A rule of thumb is to make the mirror no thinner than around 1/12 the longest unsupported dimension. As can be seen in a formula for mirror inertia, the inertia is controlled by length, width and thickness, as indicated by the formula, width and thickness add together. Normally the mirror is significantly wider than it is thick, and therefore an increase in thickness has very little impact on mirror inertia, especially when compared to the effect of increasing width.

Formula for Mirror Mass and Mirror Inertia

Consider a formulas for mirror mass and mirror inertia. To calculate the inertia of a rectangular mirror, you must first find the mass of the mirror by applying the following formula:

Mirror Mass=Density*Mirror Length*Mirror Width*Mirror Thickness.

Once the mass is known, the inertia (along the axis of the mirror Length) can be found by applying the following formula:

Mirror Inertia=Mirror Mass*(Mirror Width$^2$+Mirror Thickness$^2$)

Economizing on Y Mirror Inertia by using a Set-Back

As described above, mechanical scanners are limited in speed by the amount of torque they can provide, and by the amount of inertia that the mirror presents to that torque. Acceleration=Torque/Inertia, and therefore to maximize acceleration, the mirror inertia must be minimized.

In the example herein presented above, it was shown that for an optical deflection angle of 60 degrees peak-to-peak in both X and Y dimensions, the Y mirror inertia is four times as high as the X mirror. Y mirror inertia would be reduced dramatically if the angle-of-incidence were changed while not affecting its peak-to-peak scan angle. This can be done very effectively, by tilting the entire X-Y orthogonal arrangement backward, along the axis of the Y scanner mirror. This is referred to as a "set-back," and permits a reducing of the Y mirror's angle-of-incidence by half of the set-back angle.

It is typical to use a set-back angle of 15 mechanical degrees, which allows for an effective reduction to the Y mirror angle-of-incidence by 7.5 degrees. While the maximum angle-of-incidence of the Y mirror was 60 degrees, the maximum angle-of-incidence now becomes 60−7.5=52.5 degrees.

Remembering that the minimum width of the mirror=secant (angle-of-incidence)*incoming beam diameter, it means the Y mirror can now be 4.93 millimeters.

Looking at the formula above for mirror inertia, it can be seen that the width has a "cubic" effect on inertia (the square effect seen in the formula for inertia multiplied by the linear affect seen in the formula for mass, which contributes to inertia). Therefore by reducing the width from 6 millimeters to 4.93 millimeters, inertia has been reduced by a factor of 1.8. Stated another way, a mirror whose width is 4.93 mm has only 0.56 times the inertia of a mirror whose width is 6 mm. With this being the case, the inertia of the Y mirror is reduced to around double that of the X mirror. Further reductions are possible by reducing unused mirror material.

Economizing on Mirror Inertia by Removing Unused Material

By studying the shape of the beam as it exists on the mirror, it can be seen that not all of the mirror material is used to reflect light. Some of the material can therefore be removed.

Mirrors Used in Vector Scanning

As above described, vector scanning involves point-to-point motions that may not have a predetermined or predictable pattern. In many cases, vector scanning is used for purposes of projecting patterns or images. If a pattern of a company logo is projected, and then the logo rotated 90 degrees, it means that the job that was once done by the X axis is now being done by the Y axis and vice-versa. Because of this, it is clear that for vector scanning applications, it is desirable for the X scanner and Y scanner to have exactly the same speed characteristics. Although it is desirable, as described above, due to the shape constraints placed on X and Y mirrors, the X mirror always has less inertia than the Y mirror. Because of this, if it is desirable to have the X scanner go the same speed as the Y scanner, it means that the X scanner must provide less torque than the Y scanner.

Most often, the X and Y scanners are made by the same company, and the same model number is used for both X and Y scanners. Therefore, in order for the X scanner to provide less torque, the closed loop servo amplifier must be de-tuned. This de-tuning can never be done perfectly. Although the torque is de-tuned, the different mirror inertias have different resonant characteristics. Thus, de-tuning always involves a sacrifice in overall system performance.

An alternative to de-tuning is to simply use the same mirror for both X and Y axis (by way of example, use a Y mirror for both the X and Y scanners). However, this too involves a sacrifice in performance. As addressed above, the set-back allowed us to reduce Y mirror inertia by nearly a factor of two, but this was only possible because the angle-of-incidence was reduced. This cannot be done as easily with the X mirror, and therefore using a Y scanner mirror designed for a set-back and placing it on the X axis means that there cannot be a scan as wide on the X axis. Moreover, the typically long length of the Y mirror used in the X-axis will actually interfere with the scanning action, since at certain angles the beam reflected from the Y-mirror will be re-reflected by the X mirror.

Another alternative to de-tuning is to modify the X mirror, not removing unused mirror material, and in fact extending the mirror along the axis of scanning. However, the X mirror cannot be extended sufficiently while avoiding the phenomenon described above, where the beam reflected from the Y mirror becomes re-reflected by the X-mirror.

Yet another alternative to de-tuning is to modify the X mirror and make it wider. As discussed above, increasing the width of the mirror will have a cubic effect on inertia. However, increasing the width of the X mirror will necessitate increasing the distance between the X and Y mirrors, which again increases the inertia of the Y mirror.

Therefore, there exists a need for a set of mirrors for a vector scanning application with the X and Y mirrors having the same inertia, and yet not incurring any of the drawbacks addressed above.

SUMMARY

Embodiments of the present invention advantageously overcome the problem of matching X and Y scanning speeds by deriving a new shape for the X mirror. The new X mirror has exactly the same inertia as the Y mirror, but whose shape does not protrude into the exiting path of the Y scanner, and thus does not interfere with scanning.

One embodiment may comprise a scanning mirror including a reflective surface having a preset width dimension measured orthogonally to its axis of rotation. The preset width dimension accommodates a maximum angle of incidence of a beam being scanned by the reflective surface. A length dimension of the reflective surface, as measured along the axis of rotation, may be at least equal to a diameter of the beam being scanned. A bottom portion of the reflective surface has an effective width dimension greater than the preset width dimension, and a top portion of the reflective surface has an effective width dimension less than the preset width dimension, such that a greater inertia is provided to the bottom portion of the scanning mirror that to the top portion. One shape for the reflective surface may comprise a trapezoid.

BRIEF DESCRIPTION OF DRAWINGS

Embodiments of the invention are described by way of example with reference to the accompanying drawings in which.

DETAILED DESCRIPTION OF EMBODIMENTS

The present invention will now be described more fully hereinafter with reference to the accompanying drawings, in which embodiments of the invention are shown by way of illustration and example. This invention may, however, be embodied in many forms and should not be construed as limited to the embodiments set forth herein. Rather, these embodiments are provided so that this disclosure will be thorough and complete, and will fully convey the scope of the invention to those skilled in the art.

Figure 1:
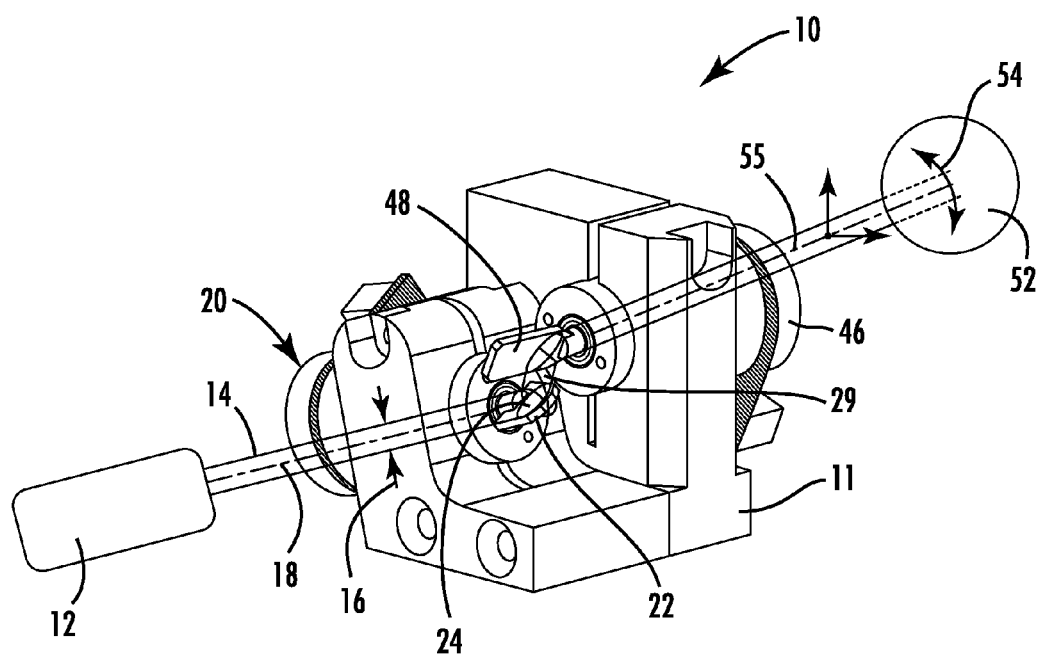
FIG. 1 is a diagrammatical illustration of one laser scanning system according to the teachings of the present invention.

With reference initially to FIG. 1, one embodiment of the invention is herein described as a laser scanning system 10 comprising a laser source 12 operable for transmitting a laser beam 14 having a generally circular cross section and measurable diameter 16. The laser beam 14 is transmitted along a beam axis 18. A first scanner 20 is operable with a first mirror 22 for providing oscillations or rotations to the first mirror. The first mirror 22 is positioned for receiving the circular incident laser beam 14 and reflecting the incident laser beam from its reflecting surface 24, as illustrated with continued reference to FIG. 1 and to FIG. 2. The first mirror 22 is angled with respect to the beam axis 18 for providing an angle of incidence 26 that results in the incident circular laser beam 14 scanning across the first mirror within a generally oval shaped profile or area 28, as illustrated with reference to FIG. 3, and reflected from the first mirror as a reflected circular shaped beam 29.

Figure 3:
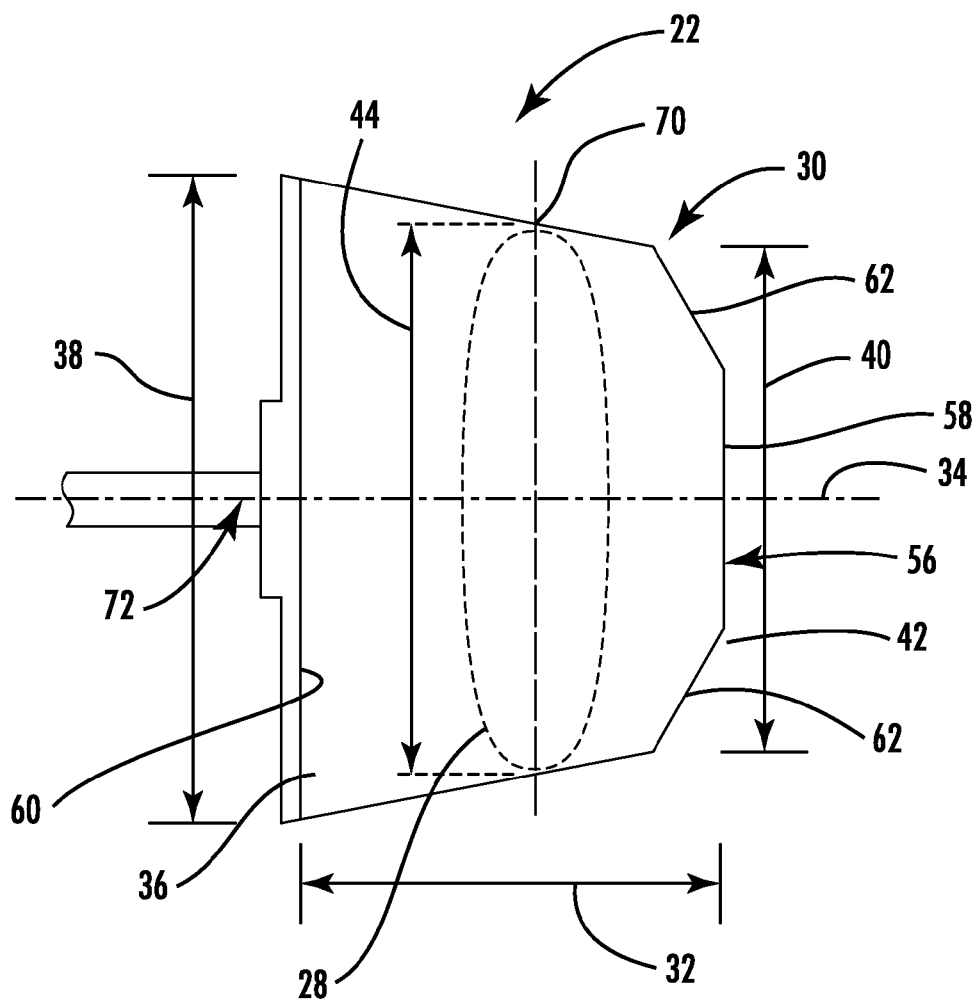
FIG. 3 illustrates one trapezoidal shaped embodiment of a mounted scanning mirror according to the teachings of the present invention.
Figure 4:
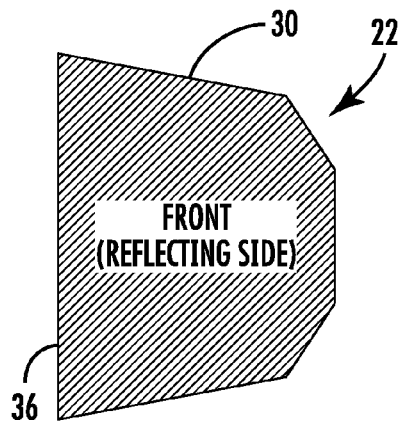
FIG. 4 is a front plan view of one embodiment of a scanning mirror illustrating a reflecting side thereof, in keeping with the teachings of the present invention.
Figure 4A:
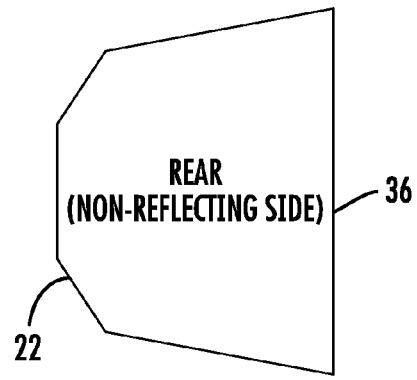
FIGS. 4A, 4B, 4C, 4D and 4E are rear, top, left, right and bottom views, respectively, of the embodiment of FIG. 4.
Figure 4B:
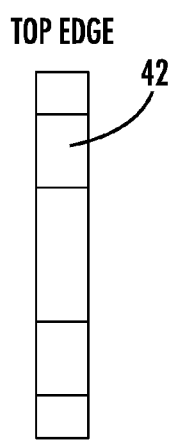
Figure 4C:
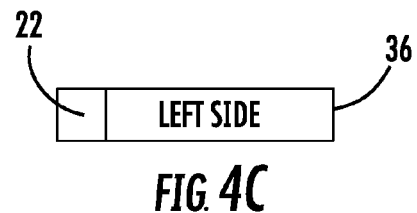
Figure 4D:
Figure 4E:
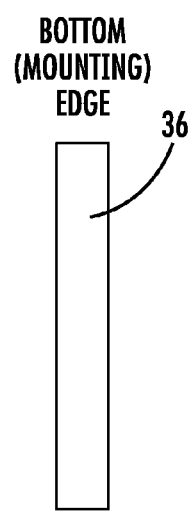

With continued reference to FIG. 3, and now to FIGS. 4, 4A, 4B, 4C, 4D and 4E, the first mirror 22 has a trapezoidal shape 30 including a length dimension 32 measured along an axis of rotation 34 of the first mirror equal to at least one diameter 16 of the incident laser beam 14 incident on the first mirror. A bottom 36 of the first mirror 22 has a bottom width dimension 38 measured orthogonally to the axis of rotation 34 is greater than a top width dimension 40 of a top 42 of the first mirror 22. It is desirable to have a width dimension 44 therebetween equal to at least a value of a secant of the angle of incidence 26 of the laser beam 14 onto the reflecting surface 24 of the first mirror 22 multiplied by the diameter 16 of the incident laser beam 14.

With reference again to FIGS. 1 and 2, a second scanner 46 operating with a second mirror 48 also provides oscillations or rotations as desired. The second mirror 48 is positioned for receiving the reflected beam 29 reflected from the first mirror 22 and further reflects 50 the reflected beam toward a target 52 is a beam pattern 54 resulting from the combinations of oscillations and reflections from the first and second mirrors 22, 48 controlling a direction of the axis 55 of the reflected beam 50. The first mirror 22 is positioned proximate the second mirror 48 for the embodiment herein described, by way of non-limiting yet desirable feature. The target 52 is positioned for receiving the patterned laser beam 54 reflected from the second mirror 48, which target may be a screen, atmospheric environment, or the like as desired.

In one embodiment, as herein illustrated with continued reference to FIG. 1, a base 11 secures the scanners 20, 46 in a desired orientation and separation for the scanning mirrors 22, 48.

As illustrated with reference again to FIG. 3, the top 42 of the first mirror 22 comprises a multiple faceted top edge 56 and includes a center portion 58 generally parallel to an edge 60 of the bottom 36 and includes left and right side undercuts 62 while maintaining the trapezoidal shape 30. Further, the trapezoidal shaped first mirror 22 is symmetrical about its axis of rotation 34.

As illustrated with reference again to FIGS. 1 and 2, to provide a desirable positioning of the first mirror 22 proximate the second mirror 48 during their oscillating movements, the second mirror 48 may also comprise a trapezoidal shape.

Figure 2:
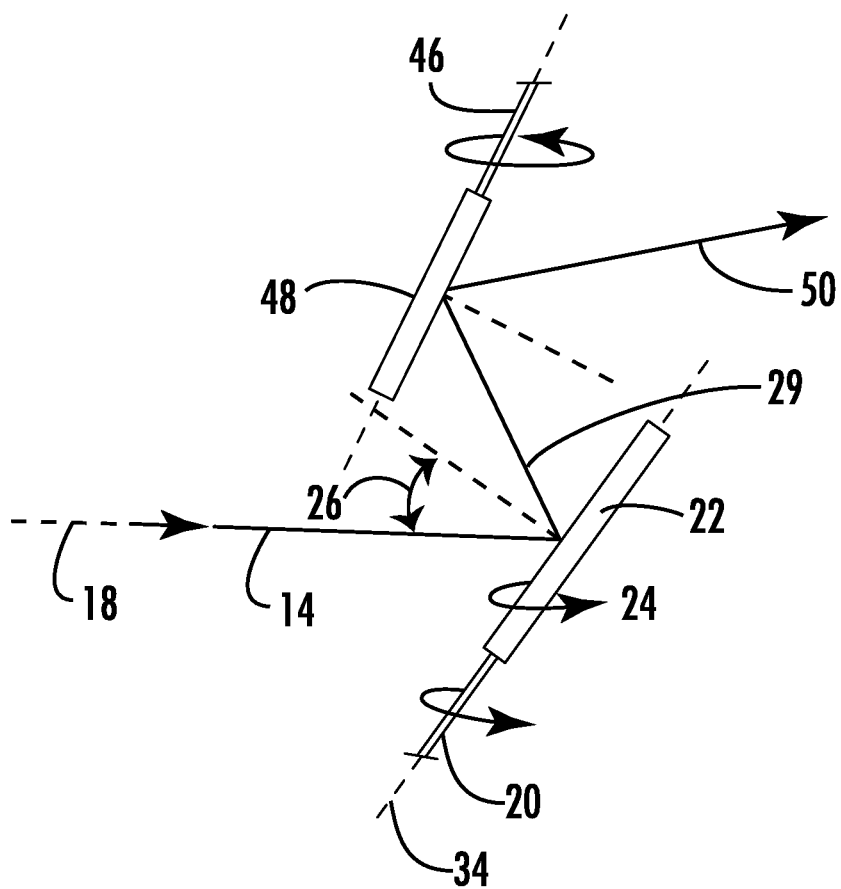
FIG. 2 is a diagrammatical illustration of a mirror pair in relation to an incident and reflected laser beam.

By way of introduction to features of embodiments according to the teachings of the present invention, and with reference now to FIG. 5, consider a mirror 64 having a simple rectangular shape and just large enough to reflect the beam 14, above described with reference to FIGS. 1 and 2, through its desired range of angles of incidence. A minimum mirror width 66 can be found using the formula presented above as: minimum width=secant (maximum angle of incidence) *beam diameter. As illustrated with continued reference to FIG. 5, a minimum mirror length 68 can be found by taking the beam diameter 16 and adding any additional length required for a mirror mounting 72 or needed mounting area.

Figure 5:
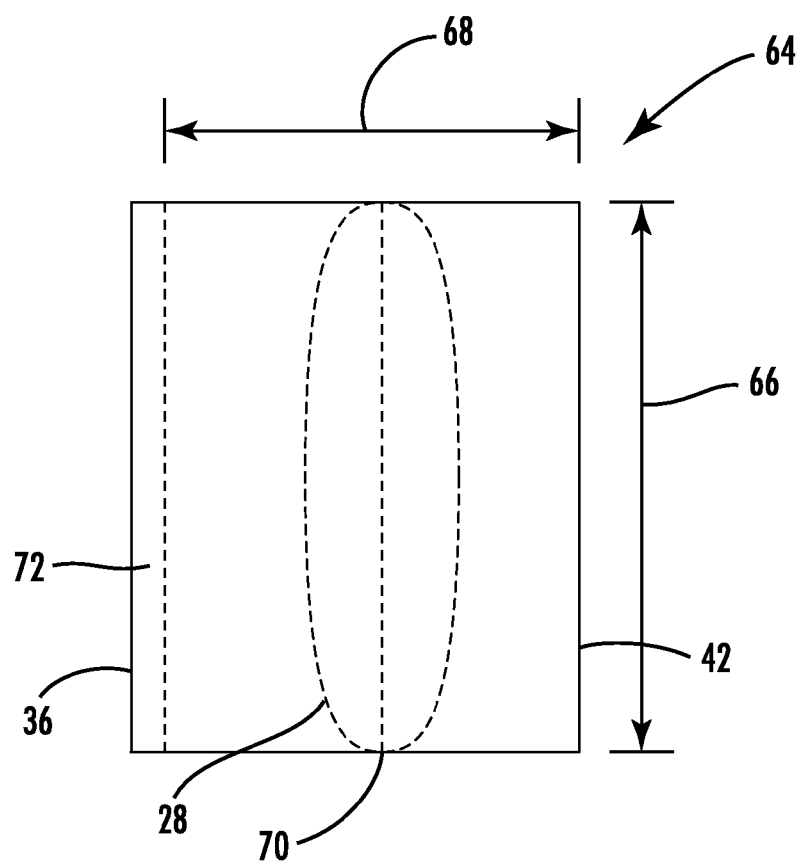
FIG. 5 illustrates a rectangular shaped scanning mirror illustrating a mounting area and a pivot point according to the teachings of the present invention.
Figure 6:
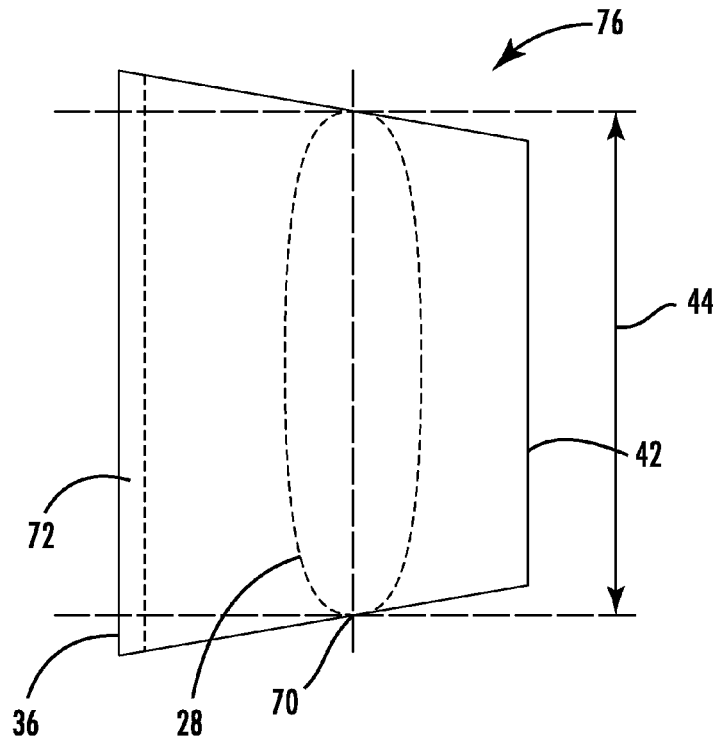
FIGS. 6 and 7 illustrate trapezoidal shaped embodiments of a scanning mirror according to the teachings of the present invention.

With continued reference to FIG. 5, a line is designated through the resulting rectangular shape 64 at the widest point that the beam is expected to reside during scanning, as herein referred to as a pivot area or pivot point 70. Maintaining the width of the mirror 66 at this pivot point 70 and making the bottom 36 of the mirror wider than the pivot point 70, and making the top 42 of the mirror narrower than the pivot point results in the trapezoidal shape 76 of the scanning mirror, as illustrated with reference to FIG. 6.

Depending upon the first and second mirror positions and orientations, additional cuts can be placed on the top of the mirror as needed, to avoid a scenario where the beam reflected from the second mirror (typically referred to as a Y mirror) being re-reflected by the first mirror (typically referred to as an X mirror), or the like. The first mirror earlier described with reference to FIGS. 3 and 4 results. Note that these top area cuts/undercuts 62 will have minimal impact on inertia because the inertia of the top 42 of the mirror 22 has already been reduced by having the trapezoidal shape 30.

Figure 7:
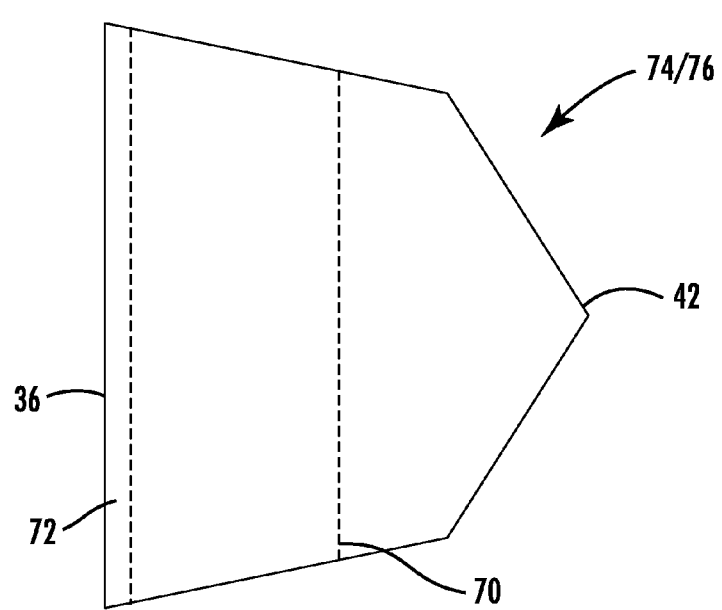

For ease of manufacturing a mirror having fewer cuts, a five-sided mirror 74 may be formed, as illustrated with reference to FIG. 7.

By way of further example, reference is again made to the formula for inertia of a rectangular mirror:

$$\text{Mirror Inertia} = \text{Mirror Mass} * (\text{Mirror Width}^2 + \text{Mirror Thickness}^2)$$

By way of non-limiting example, using this formula as guidance, place the pivot point 70, as above described, at a center location, and include the center dimension 44 and the mirror length dimension 32 above described. In this case, changing the shape from the rectangular shaped mirror 64 illustrated with reference to FIG. 5, to a trapezoidal shaped mirror 76 illustrated with reference to FIG. 6 will not change the mass. The mirror thickness also does not change. However, as above described, the mirror width is wider on the bottom 36, and narrower on the top 42. If the mass does not change, it is clear that the mirror width has a square-law exponential effect on mirror inertia. With this being the case, the inertia will increase at the bottom 36 of the mirror 22, 74 more quickly than it will decrease at the top 42 of the mirror. Because of this, a desired way to increase the inertia of the first mirror 22 (typically an X mirror) in a scanning system such as the system 10 herein described by way of example, is to increase its width at the bottom while decreasing its width at the top.

Note that when the space between the X and Y mirrors are desirably adjusted, the pivot point is not only the point on the mirror where the beam is the widest, but it also represents the place on the X mirror where the Y mirror is the closest. Therefore, changing the shape of the mirror to the trapezoidal shape as herein described, the pivot point will not increase possible mechanical interference of the X and Y mirrors. Because of this, the distance between the X and Y mirrors does not need to increase in order to take advantage of embodiments of the invention as herein described by way of example.

Another benefit resulting from the teachings of the present invention is that when the bottom 36 of the mirror 22 is made wider, it also provides additional stiffness for the mounting or mounting area 72, thus the mirrors 22, 74, 76 also provide improved cross-axis wobble characteristics.

Calculations can be done by hand, or experimentation may be aided using a Computer Aided Engineering program such as Solid Works, which allows you to change the shape of mechanical features and periodically monitor mirror inertia. The trapezoid-like shape can be adjusted until the X mirror inertia is the same as the Y mirror inertia.

It is of interest to note that while a resulting shape of embodiments herein presented may appear to simply be a reverse of shapes typically employed in the industry, the benefits resulting from features of embodiments herein presented dramatically satisfy a need not yet resolved in the art. In essence, the scanning mirrors described according to the teachings of the present invention take on an opposite shape as typically used in the art and thus a clear teaching away for that of the present invention.

Although the invention has been described relative to various selected embodiments herein presented by way of example, there are numerous variations and modifications that will be readily apparent to those skilled in the art in light of the above teachings. It is therefore to be understood that, within the scope of the claims supported by this specification, the invention may be practiced other than as specifically described.

That which is claimed is:

1. A laser scanning system comprising:
   a laser source operable for transmitting a laser beam having a generally circular cross section and measurable diameter thereof, the laser beam transmitted along a beam axis;
   a first scanner having a first mirror operable thereby for at least one of oscillations and rotations, the first mirror positioned for receiving the generally circular laser beam reflecting the laser beam therefrom, wherein the first mirror is angled with respect to the beam axis providing an angle of incidence such that the generally circular laser beam received thereby and scanned within an oval shaped beam area, and wherein the first mirror has a trapezoidal shape including a length dimension measured along an axis of rotation of the first mirror equal to at least one diameter of the laser beam incident on the first mirror, a bottom width dimension measured orthogonal to the axis of rotation greater than a top width dimension and a width dimension therebetween equal to at least a secant of the angle of incidence of the laser beam onto the first mirror times the diameter thereof;
   a second scanner having a second mirror operable thereby for at least one of oscillations and rotations, the second mirror positioned for receiving the laser beam reflected from the first mirror and reflecting the laser beam therefrom, the first mirror positioned proximate the second mirror; and
   a target positioned for receiving the laser beam reflected from the second mirror.

2. The laser scanning system according to claim 1, wherein the top surface of the first mirror comprises a multiple faceted edge.

3. The laser scanning system according to claim 2, wherein the top surface comprises a center portion generally parallel to the bottom surface and undercut left and right sides portions, and wherein the trapezoidal shaped first mirror is symmetrical about the axis of rotation of the first mirror.

4. The laser scanning system according to claim 1, wherein the second mirror has a trapezoidal shape including a bottom width dimension greater than a top width dimension.

5. The laser scanning system according to claim 1, wherein a maximum angle of incidence of the laser beam onto the first mirror is sixty degrees and the width of the first mirror between the top width and the bottom width is twice the diameter of the incident laser beam.

6. A laser scanning system comprising:
   a first scanner having a first mirror operable thereby for at least one of oscillations and rotations, the first mirror positioned for receiving a laser beam and reflecting the laser beam therefrom, wherein the first mirror is angled with respect to a beam axis for providing an angle of incidence such that the laser beam is scanned over and reflected from a generally oval shaped area on the first mirror, and wherein the first mirror has a trapezoidal shape including a length dimension measured along an axis of rotation of the first mirror equal to at least one diameter of the laser beam incident on the first mirror, a bottom width dimension measured orthogonal to the axis of rotation greater than a top width dimension and a width dimension therebetween sufficient for reflecting all of the laser beam within the oval shaped area; and
   a second scanner having a second mirror operable thereby for at least one of oscillations and rotations, the second mirror positioned for receiving the laser beam reflected from the first mirror and reflecting the laser beam therefrom, the first mirror positioned proximate the second mirror.

7. The laser scanning system according to claim 6, wherein the laser beam comprises a circular cross section, and wherein the width dimension between the top and bottom of the first mirror including the oval shaped area is equal to at least a secant of the angle of incidence of the laser beam onto the first mirror times the diameter thereof.

8. The laser scanning system according to claim 6, further comprising a laser source operable for transmitting the laser beam having the circular cross section and measurable diameter.

9. The laser scanning system according to claim 6, wherein the top surface of the first mirror comprises a multiple faceted edge.

10. The laser scanning system according to claim 9, wherein the top surface comprises a center portion generally parallel to the bottom surface and undercut left and right sides portions, and wherein the trapezoidal shaped first mirror is symmetrical about the axis of rotation of the first mirror.

11. The laser scanning system according to claim 6, wherein the second mirror has a trapezoidal shape including a bottom width dimension greater than a top width dimension.

12. A laser scanning mirror comprising:
a reflective surface having a trapezoidal shape;
a length dimension measured along an axis of rotation of the mirror equal to at least one diameter of a laser beam to be incident thereon;
a bottom width dimension measured orthogonal to the axis of rotation greater than a top width dimension; and
a width dimension therebetween equal to at least a secant of an angle of incidence of the laser beam incident onto the reflective surface times the diameter of the incident laser beam.

13. The laser scanning mirror according to claim 12, wherein a top surface of the mirror comprises a multiple faceted edge.

14. The laser scanning mirror according to claim 12, wherein the top surface comprises a center portion generally parallel to the bottom surface and undercut left and right sides portions, and wherein the mirror is symmetrical about its axis of rotation.

15. The laser scanning system according to claim 12, wherein a maximum angle of incidence of the laser beam onto the mirror is sixty degrees and wherein the width dimension between the top width and the bottom width is twice the diameter of the incident laser beam.

\* \* \* \* \*